(12) United States Patent
Mori et al.

(10) Patent No.: US 6,301,412 B1
(45) Date of Patent: Oct. 9, 2001

(54) APPARATUS AND METHOD FOR MAKING MULTI-BRANCHING OPTICAL COUPLER

(75) Inventors: Tsuneo Mori; Masaaki Shirota; Seiki Ejima; Jun Abe; Sayuri Maeda; Kazuo Koya, all of Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/106,019

(22) Filed: Jun. 29, 1998

(30) Foreign Application Priority Data

| Jun. 27, 1997 | (JP) | ................................ 9-171755 |
| Jun. 30, 1997 | (JP) | ................................ 9-173371 |
| Sep. 30, 1997 | (JP) | ................................ 9-266244 |
| Oct. 9, 1997 | (JP) | ................................ 9-276905 |

(51) Int. Cl.⁷ ............................................... G02B 6/26
(52) U.S. Cl. ............................................ 385/46; 385/43
(58) Field of Search ........................................ 385/46, 43

(56) References Cited

U.S. PATENT DOCUMENTS

| 4,687,284 | 8/1987 | Rawson et al. . | |
| 4,726,643 | * 2/1988 | Imoto et al. | ........................... 385/46 |
| 4,957,338 | * 9/1990 | Thorncraft et al. | ..................... 385/43 |
| 5,121,452 | * 6/1992 | Stowe et al. | ............................ 385/46 |
| 5,408,556 | * 4/1995 | Wong | ..................................... 385/48 |
| 5,883,992 | * 3/1999 | Gonthier | ................................ 385/43 |

FOREIGN PATENT DOCUMENTS

| 60-24505 | 2/1985 | (JP) . |
| 63-70208 | 3/1988 | (JP) . |
| 63-205616 | 8/1988 | (JP) . |
| 07-140346 | 6/1995 | (JP) . |
| 2672165 | 7/1997 | (JP) . |

OTHER PUBLICATIONS

"Novel Structure for Monolithic Fused–Fiber 1X4 Couplers", Huang et al., Fifth Optoelectronics Conference (OEC '94) Technical Digest, Jul. 1994, Makuhari Mesee.

* cited by examiner

Primary Examiner—Rodney Bovernick
Assistant Examiner—Michael J Stahl
(74) Attorney, Agent, or Firm—Pillsbury Winthrop LLP (57) ABSTRACT

A mask having a center hole for passing through a center fiber, which is one of multiple fibers, and multiple surrounding holes for passing through surrounding fibers, which are the remainder of the multiple fibers, and a stress adjusting unit for holding stresses generated in the center fiber and surrounding fibers to a desired constant value, respectively, are installed. The surrounding fibers are rotated around the center fiber by rotating the mask. The center fiber and the surrounding fibers that have been twisted around the center fiber are heated with a heating apparatus and drawn. The center fiber and the surrounding fibers are fixed using a clamp installed between the stress adjusting unit and the heating apparatus.

20 Claims, 9 Drawing Sheets

APPARATUS AND METHOD FOR MAKING MULTI-BRANCHING OPTICAL COUPLER

BACKGROUND OF THE INVENTION

1. Field of Invention

The present invention relates to an apparatus and method for making a multi-branching optical coupler.

2. Description of the Related Art

With the rapid progress of optical fiber transmission technology, optical data links, which utilize optical fibers for transmitting data between computers or between a computer and a terminal, have been the subject of much research and development. In configuring such an optical data link, a multi-branching optical coupler, which is capable of mixing light signals from multiple input optical fibers and distributing the mixed light signals evenly and with a low loss to multiple output optical fibers, is an essential device. The method for making such optical star couplers is disclosed in Japanese patent applications, Laid-Open No. 60-24505 and Laid-Open No. 63-205616.

The optical star coupler disclosed in Japanese Patent Application Laid-Open No. 60-24505 is made by inserting an optical fiber bundle into a glass tube, and heating and drawing the glass tube so that the optical fibers are substantially evenly arranged with respect to the center of the coupler. The optical star coupler disclosed in Japanese Patent Application Laid-Open No. 63-205616 is made by coupling multiple 3 dB optical couplers in multi-stages, realizing many branch points.

In the case of the former optical coupler, the optical fibers are arranged symmetrically about the center of the coupler. However, in this case, since no fiber exists at the center, the symmetry with respect to the injection port is poor. As a result, it is difficult to achieve equi-branching characteristics. In the case of the latter optical coupler, unlike a batch fuse type coupler, several couplers have been coupled in multi-stages to form the optical star coupler. As a result, the overall size of the optical star coupler is significantly increased.

Another optical fiber type star coupler disclosed in Japanese Patent Application Laid-Open No. 63-70208 is made by twisting, fusing, and drawing an optical fiber bundle, and covering the optical fiber bundle with a glass tube. However, in this optical fiber type star coupler, the initial arrangement of the fibers is not preserved after the twisting, fusing, and drawing process. As a result, the variance of the intensities of the light output from the fibers is hard to control Therefore, in this case, it is difficult to achieve equi-branching characteristics.

In addition, a multi-branching optical coupler having four branches disclosed in OEC 1994 pp364 is made arranging five fibers on a plane taking symmetry into consideration. In this case, one of these fibers does not contribute to the outputs. This fiber is difficult to produce. Moreover, since the five fibers are arranged horizontally in a row, the width of the coupler is increased. As a result, the size of the coupler case is increased significantly also.

In addition, a method for making a fiber optic coupler and a 1×N fiber optic coupler is disclosed in Japanese Patent Application Laid-Open No. H7-140346. According to this method, N fibers are first inserted into a glass tube. The glass tube is then heated and drawn, collapsing the entire glass tube. This method involves a process for putting the fibers into the glass tube, and a process for collapsing the entire glass tube. It is not easy to make these couplers due to these making processes. In addition, it is extremely difficult to collapse the entire glass tube without distorting the fibers. Moreover, the collapsed fibers are deformed, in which case, the light transmission properties of the fibers, for example, the polarized wave dependency, can be adversely affected.

SUMMARY OF THE INVENTION

Therefore, it is an object of the present invention to provide an apparatus and method capable of easily making the multi-branching optical coupler.

According to a first aspect of the present invention, the apparatus for making a multi-branching optical coupler has a mask including a center hole for passing through a center fiber selected from the plurality of fibers, and a plurality of surrounding holes for passing through surrounding fibers that are remainder of the plurality of fibers, such that the surrounding holes are arranged around the center hole and are separated from each other by an equal distance. The apparatus for making a multi-branching optical coupler further has a rotation stage for rotating the mask so as to twist the surrounding fibers about the center fiber, a heating apparatus for heating the center fiber and the surrounding fibers that have been twisted by the rotation stage about the center fiber; and a drawing stage for drawing the center fiber and surrounding fibers that have been heated with the heating apparatus.

According to a second aspect of the present invention, the apparatus for making a multi-branching optical coupler further has a stress adjusting unit for holding stresses, which are generated in the center fiber and each of the surrounding fibers, when the center fiber and surrounding fibers are twisted with the rotation stage, respectively. According to a third aspect of the present invention, the apparatus for making a multi-branching optical coupler, further comprises a clamp installed between the stress adjusting unit and the heating apparatus, for fixing the center fiber and surrounding fibers. According to a fourth aspect of the present invention, the mask has seven or more surrounding holes and the diameter of the center hole is larger than the diameters of the surrounding holes.

According to a fifth aspect of the present invention, the apparatus for making a multi-branching optical coupler, which branches light injected to one fiber into a plurality of fibers, has: a rotation stage for twisting the plurality of fibers; a stress adjusting unit for holding a stress, which is generated in each of the plurality of fibers when the fibers are twisted with the rotation stage; a heating apparatus for heating the plurality of fibers that have been twisted with the rotation stage; and a drawing stage which shifts for drawing the fibers that have been heated with the heating apparatus.

According to a sixth aspect of the present invention, the apparatus for making a multi-branching optical coupler further has a clamp installed between the stress adjusting unit and the heating apparatus for fixing the fibers. According to a seventh aspect of the present invention, the stress adjusting unit has elastic holding units for elastically holding the plurality of fibers independently from each other.

According to an eighth aspect of the present invention, the apparatus for making a multi-branching optical coupler further has a mask including a center hole for passing through a center fiber selected from the plurality of fibers, and a plurality of surrounding holes for passing through surrounding fibers that are remainder of the plurality of fibers, such that the surrounding holes are arranged around the center hole and are separated from each other by an equal distance. The stress-adjusting unit holds the center fiber that has passed through the center hole and the surrounding fibers that have passed through the surrounding holes.

According to a ninth aspect of the present invention, the apparatus for making a multi-branching optical coupler further has a monitor light outputting apparatus for injecting a monitor light to a light input end of the center fiber; and a light receiving apparatus for monitoring a light output from an output end of the center fiber and another light output from one of the surrounding fibers.

According to a tenth aspect of the present invention, the apparatus for making a multi-branching optical coupler further has a stopping means for stopping the shift of the drawing stage when the intensity of the light output from the output end of the center fiber becomes substantially equal to the intensity of the another light output from the one of the surrounding fibers.

According to a eleventh aspect of the present invention, the mask has seven or more surrounding holes and a diameter of the center hole is larger than diameters of the surrounding holes. According to a twelfth aspect of the present invention the diameter of the center fiber CLDc, the diameter the surrounding holes CLDs, and a total number n of the center hole and surrounding holes satisfy an equation, $0 \leq CLDc-(CLDs/\sin(\pi/(n-1)))+CLDs \leq 100$ μm.

According to a thirteenth aspect of the present invention, the method for making a multi-branching optical coupler has a preparing step for preparing one center fiber having an input end to which the light is injected and an output end from which one of the branched light is output; an arranging step for arranging surrounding fibers on the exterior circumference of the center fiber separating the surrounding fibers from each other by substantially an equal distance; a heating step for heating with a heating apparatus the center fiber and surrounding fibers that have been arranged in the arranging step; and a drawing step for drawing the center fiber and surrounding fibers, which have been heated in the heating step, in an axial direction of the center fiber so as to form a fused portion where each of the surrounding fibers is fused to the center fiber.

DETAILED DESCRIPTION OF THE INVENTION

Figure 1A:
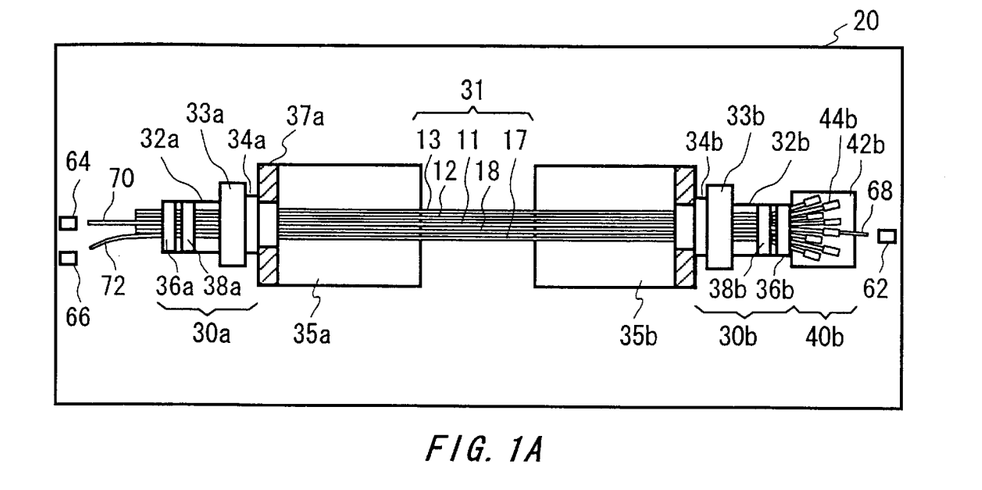
FIGS. 1A and 1B are top and front views of a multi-branching optical coupler making apparatus according to the present invention.
Figure 1B:
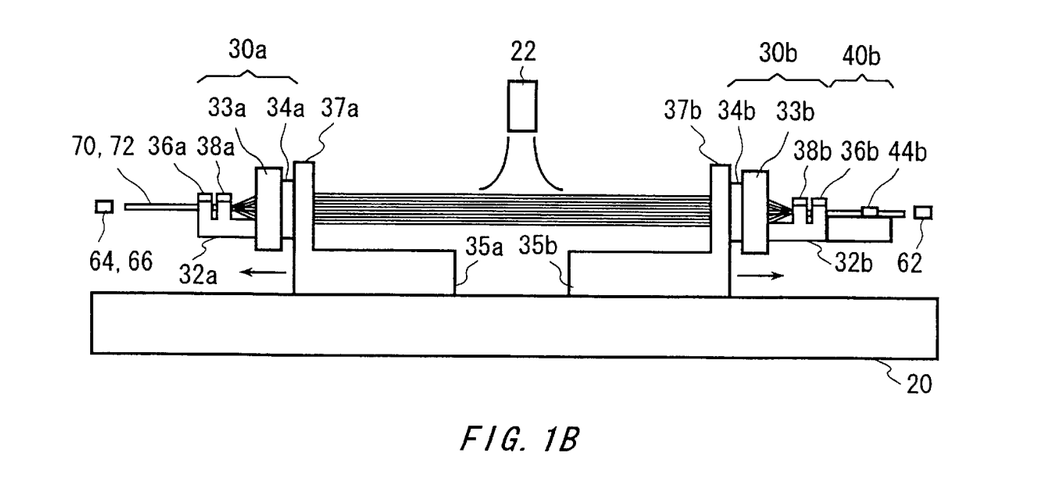

FIGS. 1A and 1B are top and front views of a multi-branching optical coupler making apparatus according to the present invention. The multi-branching optical coupler making apparatus has a base 20, two drawing stages 35a and 35b which are supported by the base 20, rotation units 30a and 30b which are installed outside the drawing stages 35a and 35b, respectively, a stress adjusting unit 40b that is installed further outside the rotation unit 30b, a gas burner 22 that is installed at the midpoint between the two drawing stages 35a and 35b as an example of a heating apparatus, a monitor light outputting apparatus 62, and two light receiving apparatuses 64 and 66. The heating apparatus suffices to be a means capable of heating the fibers 31. For example, the heating apparatus may be a means for blowing hot air or an infrared ray radiating means.

The rotation unit 30a has a mask 34a for holding multiple fibers 31 separating them from each other by a prescribed distance, a rotation stage 33a for rotating the rotation unit 30a, a clamp table 32a and clamp 36a as an example of a fixing unit which fixes the fibers 31, and a sliding holding unit 38a which holds the fibers 31 so that the fibers 31 will slide freely. In addition, the drawing stage 35a has a rotating holding unit 37a which holds the rotation unit 30a so that the rotation unit 30a rotates freely. The rotation unit 30b, the drawing stage 35b, mask 34b, the rotating holding units 37b will not be explained here since they are structured identically as the rotation unit 30a, the drawing stage 35a, the mask 34a, and the rotating holding units 37a, respectively.

First, several fibers 31 are made to pass through the rotating holding units 37a and 37b, the masks 34a and 34b, and the sliding holding units 38a and 38b, where n is the number of desired branches. One end of each of the fibers 31 is clamped to the clamp table 32a using the clamp 36. The other end of each of the fibers 31 is held with the stress-adjusting unit 40b. Next, the rotation stages 33a and 33b are grabbed by hand, and the fibers 31 are twisted by rotating the entire rotation units 30a and 30b in opposite directions several times. As an alternative, only one of the rotation units 30a and 30b may be rotated by a hand. Further, both rotation units 30a and 30b may be rotated using a motor instead of hand.

The stress-adjusting unit 40b has a stress adjusting table 42b and several elastic holding units 44b, which independently hold the fibers 31, respectively. Each of the elastic holding units 44b has an elastic body such as a spring or the like, and is capable of applying a tension of desired strength to the fibers 31, respectively. The spring constant of the elastic body of each of the elastic holding units 44b is sufficiently small with respect to the shift amount of each of the fibers 31 when the rotation units 30a and 30b are rotated. Therefore, the stresses applied to the fibers 31 are held constant when the rotation units 30a and 30b are rotated. As a result, a suitable strength of tension can be applied to each of the fibers 31, preventing the fibers 31 from getting disconnected.

Next, the fibers 31 are fixed using the clamp 36b. The burner 22 is then ignited so as to heat the fibers 31. After a prescribed length of time has passed since the ignition of the burner 22, one of the drawing stages 35a and 35b is shifted away from the other drawing stage using a motor not shown in the drawings. In this way, the fibers 31 are drawn. Before the drawing stage 35a or 35b is shifted, the stresses applied to the fibers 31 are held constant by the stress-adjusting unit 40b. Therefore, the fibers 31 can be drawn evenly.

One fiber selected from the fibers 31 is installed at the center of all the fibers 31. This center fiber is labeled by a reference numeral 11. The other fibers 31 are arranged around the center fiber 11, separating them from each other by an equal distance. The fibers 31 installed around the center fiber 11 are called surrounding fibers in this document. FIG. 1 shows only four surrounding fibers 12, 13, 17, and 18. However, the number of surrounding fibers is not restricted to four. The center fiber 11 has an input end 68 to which a monitor light that is output from the monitor light outputting apparatus 62 is injected and an output end 70 from which the injected light is output.

The core of the center fiber 11 extends continuously from the input end 68 to the output end 70. A monitor light is injected to the input end 68 of the center fiber 11. The amount of light output from the output end 70 of the center fiber 11 and the amount of light output from an output end 73 of arbitrarily selected one of the surrounding fibers 12, 13, 17, and 18 are monitored using light receiving apparatuses 64 and 66, respectively. The heating process by the burner 22 and the shifting process of the shifting stages 35a and 35b are stopped when the light amount output from the output end 70 of the center fiber 11 becomes approximately equal to the light amount output from an output end 73 of arbitrarily selected one of the surrounding fibers 12, 13, 17, and 18.

After this, the elastic holding units 44b are taken out so as to hold the fibers 31 again. An equal strength of stress is applied to each of the fibers 31 between the clamp 36b and the elastic holding units 44b. The value of this stress may be zero. The fibers 31 become sufficiently hard after a prescribed length of time passes since the burner 22 is turned off. Once the fibers 31 have become sufficiently hard, the clamp 36b is taken out. Moreover, one of the drawing stages 35a and 35b is shifted by a prescribed distance so as to apply a desired strength of tension to each of the fibers 31. The shift amount of the drawing stage 35a or 35b can be detected by monitoring on a computer connected to the multi-branching coupler making apparatus the number of rotations of the motor that shifts the drawing stage 35a or 35b. Both ends of the fused portion of each of the fibers 31 are fixed with resin to a quartz plate while a prescribed strength of tension is applied to the fibers 31. In addition, the fibers the fibers 31 were stored in a cylindrical, metal case for protection. In this way, a multi-branching optical coupler was completed.

Figure 2A:
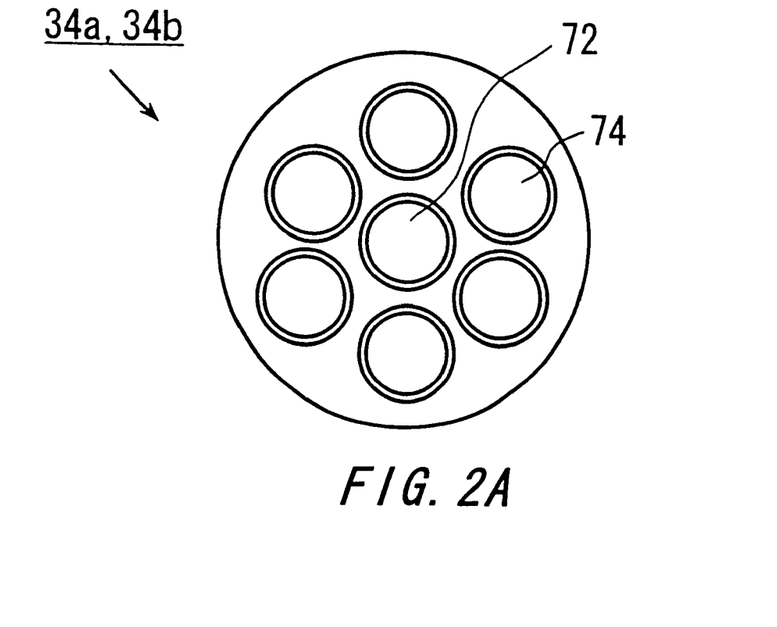
FIG. 2A is a top view of a mask having six surrounding holes.

FIG. 2A shows an example of a top view of the masks 34a and 34b. A center hole 72 is formed at the center of the masks 34a and 34b. Several surrounding holes 74 are formed around the center hole 72 separating the surrounding holes from each other by an equal distance. The center fiber 11, to which the light to be branched out is injected, is made to pass through the center hole 72. The surrounding fibers are made to pass through the surrounding holes 74. In this way, the surrounding fibers can be installed around the center fiber 11 separating the surrounding fibers from each other by an equal distance. In addition, the stress applied to each of the surrounding fibers is kept constant by the stress-adjusting unit 40b shown in FIG. 1. Hence, the surrounding fibers are fused evenly around the center fiber 11, making it possible to branch the injected light evenly to the surrounding fibers.

It is desirable that the inside diameters of the center hole 72 and the surrounding holes 74 be larger than the clad diameters of the center fiber 11 and surrounding fibers that pass through the center hole 72 and the surrounding holes 74, respectively, by approximately 1 $\mu$m. It is desirable that the corners of interior circumferences of the center hole 72 and surrounding holes 74 be rounded and the interior circumferences made smooth so that the center fiber 11 and surrounding fibers will not be damaged.

When the clad diameter of the center fiber 11 is equal to that of each of the surrounding fibers, at most six surrounding fibers can be arranged around the exterior circumference of the center fiber 11. The interior diameter of the center hole 72 is set equal to those of the surrounding holes 74 so that the center fiber 11 and the surrounding fibers, which have the same diameter, can pass through the center hole 72 and surrounding holes 74, respectively. In other words, when the number of surrounding holes 74 is less than or equal to six, the diameter of the center hole 72 is equal to that of the surrounding holes 74.

Figure 2B:
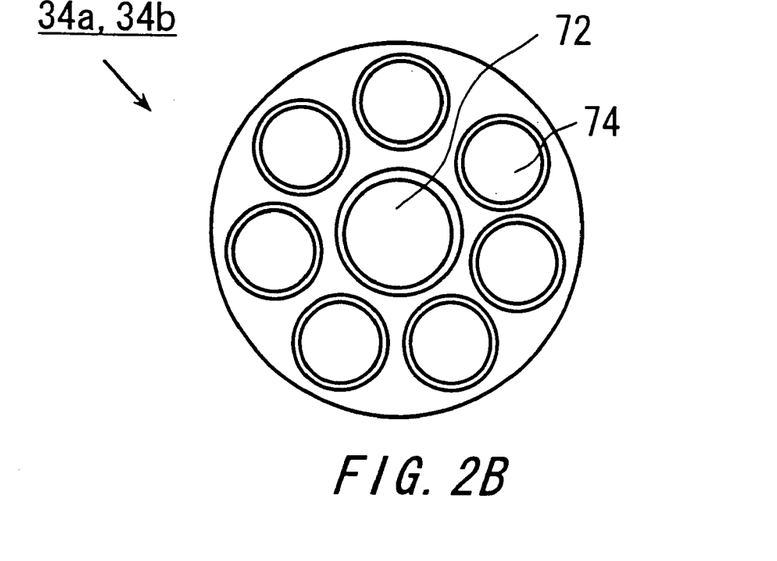
FIG. 2B is a top view of a mask having seven surrounding holes.

FIG. 2B shows another example of a top view of the masks 34a and 34b. When the number of fibers n is greater than or equal to eight (when the number of surrounding fibers is greater than or equal to seven), in order to bring all the surrounding fibers into contact with the exterior circumference of the center fiber 11, the diameter (clad diameter) of the center fiber 11 must be made larger than that of each of the surrounding fibers. When n is greater than or equal to eight and the minimum clad diameter of the center fiber required to arrange the surrounding fibers on the exterior-circumference of the center fiber 11 is denoted by CLDc(min), then CLDc(min) can be expressed in terms of CLDs by the following equation (1).

$$CLDc(min) = (CLDs/\sin(\pi/(n-1))) - CLDs \tag{1}$$

In accordance with equation (1), setting n=8, the clad diameter of the center fiber 11 needs to be made larger than or equal to 163 $\mu$m when the clad diameter of each of the surrounding fibers is 125 $\mu$m. For example, if the clad diameter of the center fiber 11 is 168 $\mu$m, all the surrounding fibers can be attached tightly around the center fiber 11.

In order to pass such center fiber 11 and surrounding fibers through the center hole 72 and surrounding holes 74, respectively, the diameter of the center hole 72 needs to be made larger than that of each of the surrounding holes 74. Hence, when the number of surrounding holes 74 is greater than equal to seven, the diameter of the center hole 72 is made larger than that of each of the surrounding holes 74. By changing the positions of the surrounding holes 74 with respect to the center hole 72, the degree of twist of the surrounding fibers can be changed. As a result, the branching ratio of the light can also be changed. In addition, by changing the arrangement of the center hole 72 or the surrounding holes 74 on the masks 34a and 34b that face each other, a disproportionate twist can be generated in the fibers 31. In this way also, the branching ratio of the light can be changed.

Figure 3:
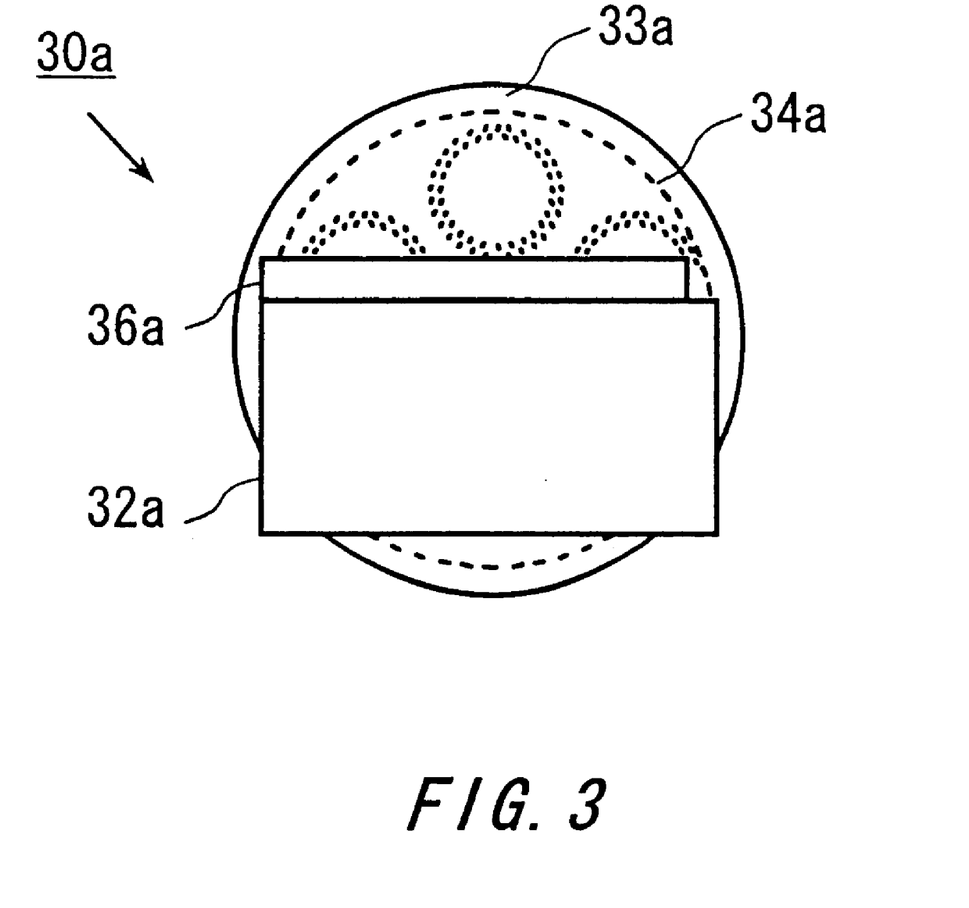
FIG. 3 shows details of a rotation stage.

FIG. 3 is a side view of the rotation unit 30a. The clamp table 32a and the mask 34a are fixed on the rotation stage 33a. The clamp 36a is installed on the clamp table 32a. As a result, by rotating the rotation stage 33a, the clamp table 32a, clamp 36a, and mask 34a can be rotated together with the rotation stage 33a. The rotation unit 30b will not be explained here since it is structured identically as the rotation unit 30a. The stress-adjusting unit 40b is further installed on the rotation unit 30b. Hence, by rotating the rotation stage 33b, the clamp table 32b, clamp 36b, mask 34b, and stress adjusting unit 40b rotate together as a whole.

Figure 4A:
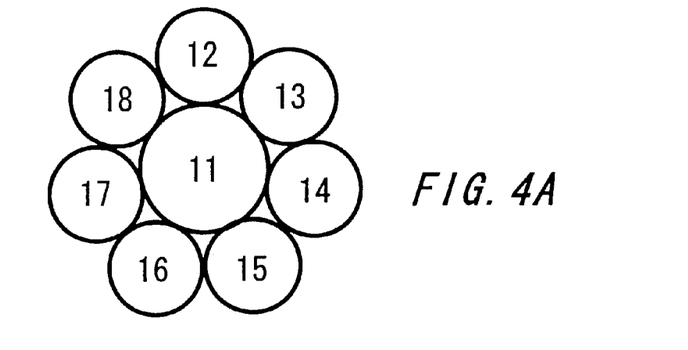
FIGS. 4A through 4C show examples of cross sectional views of a multi-branching optical coupler according to the present invention.
Figure 4B:
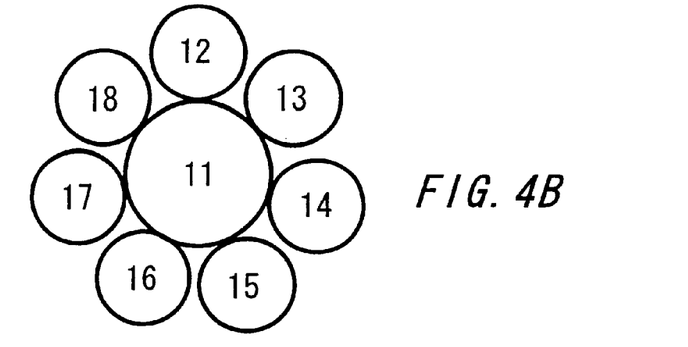
Figure 4C:
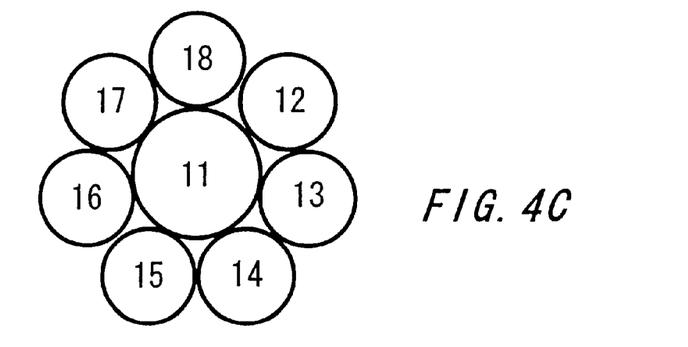

FIGS. 4A through 4C show cross-sections of a (1 input)×(8 output) multi-branching optical coupler according to the present invention before the fibers are heated and drawn. The center fiber 11 is fused with each of the surrounding fibers 12 through 18 in order to branch injected light from the center fiber 11 to the surrounding fibers 12 through 18. In FIG. 4A, each of the surrounding fibers 12 through 18 is in contact with its neighboring surrounding fibers. However, as FIG. 4B shows, the surrounding fibers 12 through 18 may be separated from each other.

If the surrounding fibers 12 through 18 are arranged evenly on the circumference of the center fiber 11, the variation between the intensities of the light output from the respective fibers can be reduced. However, temperature discrepancies among the fibers arise while the fiber bundle is being heated. In addition, when the fibers are drawn, the tensile strength of the respective fibers against the drawing may vary. Therefore, even if the surrounding fibers 12 through 18 are arranged evenly on the circumference of the center fiber 11, the surrounding fibers 12 through 18 may be displaced from their initial positions by these factors.

In order to prevent this problem, the fiber bundle is twisted around the center fiber. In this way, the surrounding fibers 12 through 18 are kept tightly attached to the center fiber 11. As a result, the surrounding fibers 12 through 18 remain tightly attached onto the circumference of the center fiber 11 while the fiber bundle is being heated and drawn. FIG. 4C shows another cross-section of the fiber bundle at a different point in the axial direction. In this case, the fiber bundle has been twisted around the center fiber. As a result, the surrounding fibers 12 through 18 have been wound around the center fiber 11. In this case, as FIG. 4C shows, at a different point in the axial direction, the positions of the surrounding fibers 12 through 18 on the cross section plane are rotated with respect to the center of the center fiber 11 as the fiber bundle is twisted.

Figure 5A:
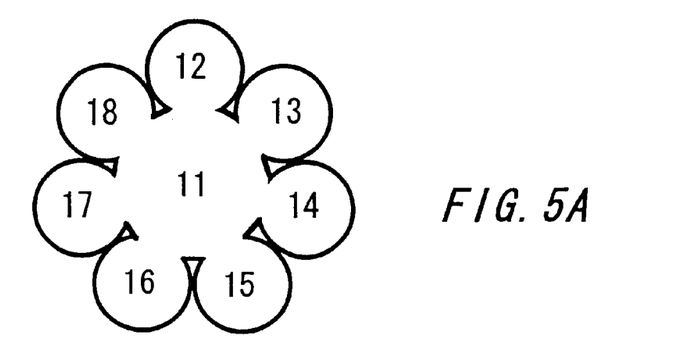
FIGS. 5A through 5C are cross-sections of a drawn-coupled region.
Figure 5B:
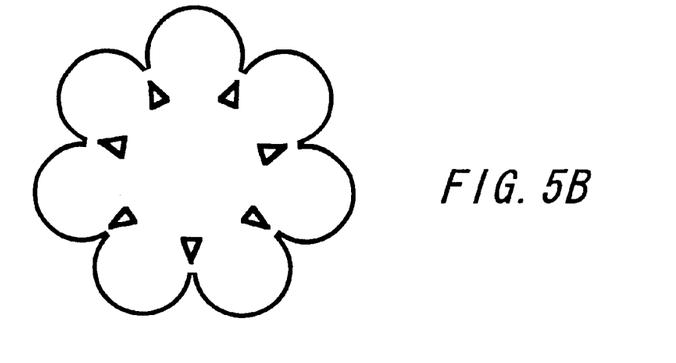
Figure 5C:
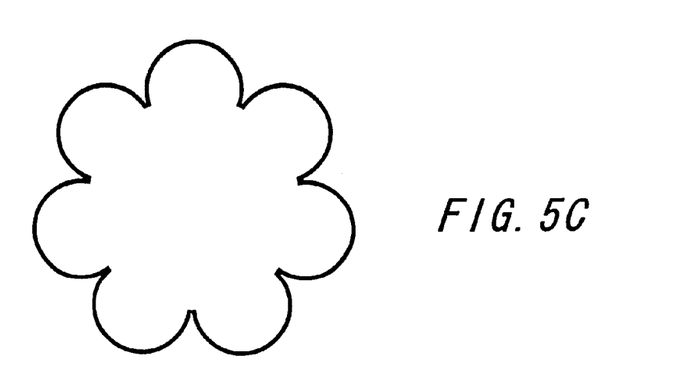

FIGS. 5A through 5C show a transformation sequence of the cross section of the coupler shown in FIG. 4C which occurs during the heating and drawing process. In FIG. 5A, the surrounding fibers 12 through 18 are fused to the center fiber 11. However, the surrounding fibers 12 through 18 are still separated from each other. In FIG. 5B, the fiber bundle has been further drawn. As a result, each of the surrounding fibers 12 through 18 has been fused with its neighboring surrounding fibers. However, at this stage, a small gap still remains between neighboring surrounding fibers. FIG. 5C shows a state in which each of the surrounding fibers 12 through 18 has become completely fused with its neighboring surrounding fibers and the above-mentioned gap has disappeared.

During these heating and drawing processes, the output from the center fiber and the output from one of the surrounding fibers are monitored. The drawing process is stopped when the intensity of the light output from the center fiber has become equal to the intensity of the light output from the monitored surrounding fiber. The state of the surrounding fibers 12 through 18 when the drawing process is completed may be any of the state shown in FIG. 5A in which each of the surrounding fibers 12 through 18 is not fused with any of its neighboring surrounding fibers, or the state shown in FIG. 5B in which a small gap remains between successive surrounding fibers, or the state shown in FIG. 5C in which all the gaps between the successive surrounding fibers have been eliminated. Even when the clad diameter of the center fiber 11 differs from that of the respective surrounding fiber, it is desirable that the propagation constant βc of the center fiber be close to the propagation constant βs of the surrounding fiber If the clad diameter of the center fiber 11 is increased beyond a certain value, a gap is created between each pair of neighboring surrounding fibers before the fiber bundle is heated and drawn. In this case, difference ΔCLD between the clad outside diameter CLDc of the actual center fiber 11 and the minimum clad outside diameter CLDc(min) of the center fiber required to arrange seven or more surrounding fibers on the exterior circumference of the center fiber can be expressed by the following equation (2) in accordance with equation (1).

$$\Delta CLD = CLDc - CLDc(\text{min}) \qquad (2)$$
$$= CLDc - (CLDs / \sin(\pi / (n-1))) + CLDs$$

Figure 6:
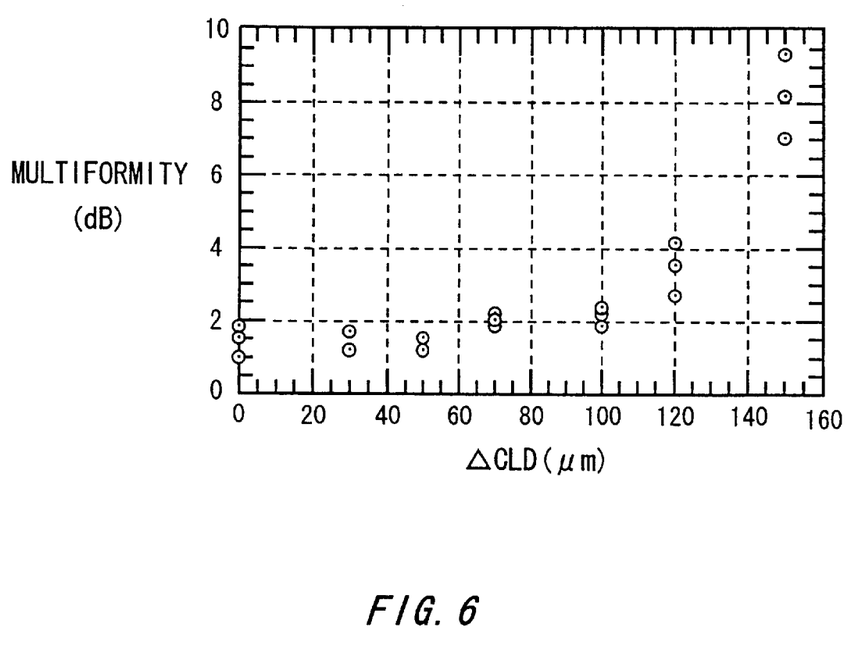
FIG. 6 shows the relation between the clad outside diameter ΔCLD and multiformity.

FIG. 6 shows an experimentally determined relation between the change in multiformity and the change in the clad diameter difference ΔCLD. Here, "multiformity" represents the multiformity of the light that is transmitted to each output fiber, and is equal to the difference between the maximum output optical power loss and the minimum output optical power loss with respect to the input optical power. If the clad diameter difference ΔCLD is too large, the variations among the light output intensities of the n fibers (the multiformity) become large. In particular, once the clad diameter difference ΔCLD becomes larger than approximately 100 μm, the multiformity rapidly grows. The degree of freedom of arrangement increases as the gap between each pair of neighboring surrounding fibers increases. As a result, the surrounding fibers are arranged unevenly. This uneven arrangement of the surrounding fibers is considered to be the cause of the rapid increase in the multiformity.

In addition, if the clad diameter of the center fiber 11 is too large, the distance between the core of the center fiber 11 and that of the respective surrounding fiber becomes large. As a result, in order to branch the injected light from the center fiber 11 to the surrounding fibers, the coupling length of the fibers must be increased. This causes the size of the coupler to increase. Therefore, it is desirable that the diameter of the center fiber 11 not be set too large, and that the clad diameter difference ΔCLD be set below 100 μm. The same holds true for the case in which n is different from eight. To accurately situate the center fiber 11 and surrounding fibers, the clearances between fibers and holes 72 and 74 of the mask 34a, 34b should be small, preferably, 1 um. Since this clearance can be ignored in comparison to the diameters of the fibers, the diameters of the center hole and surrounding holes are nearly CLDc and CLDs and the equation (2) is sufficed among those hole diameters CLDc and CLDs.

Figure 7A:
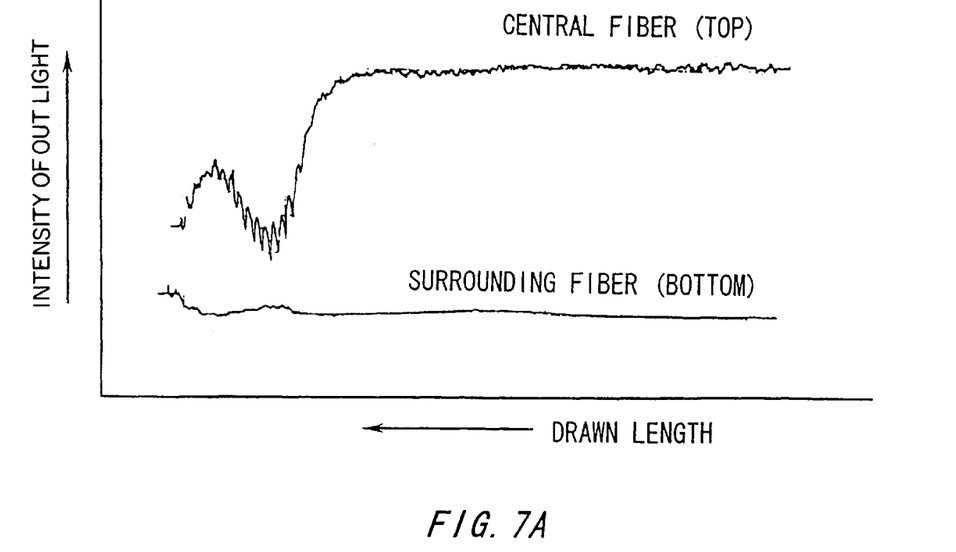
FIGS. 7A and 7B show the relation between the drawn length of the fiber bundle and the intensity of the light output from the center fiber and surrounding fiber.
Figure 7B:
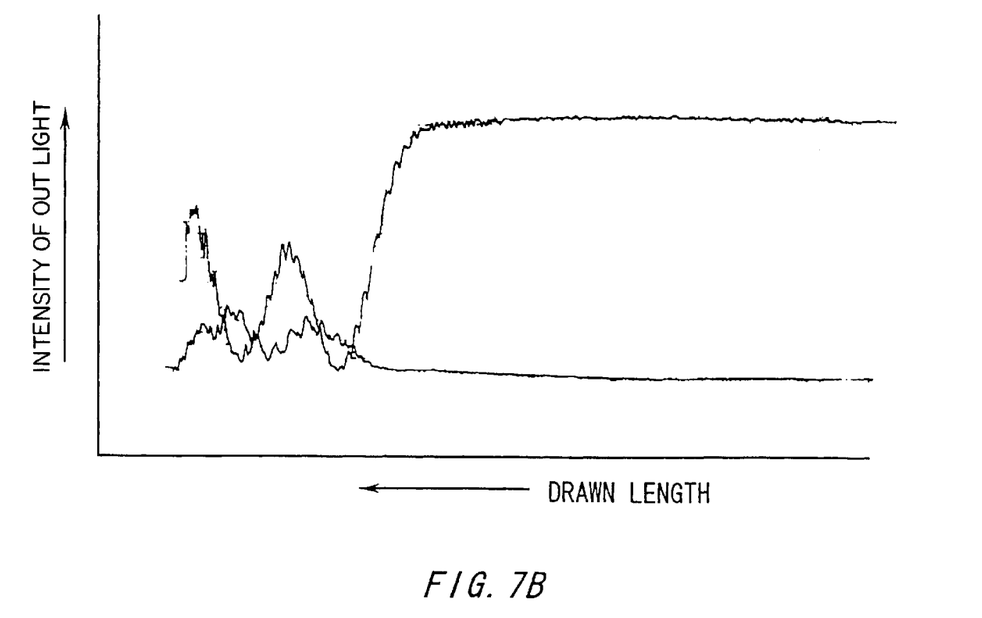

FIG. 7A shows the changes in intensities of the light output from the center fiber 11 and monitored surrounding fiber with respect to the drawn length of the center fiber in the case where the propagation constant βc of the center fiber differs greatly from the propagation constant βs of the surrounding fibers. FIG. 7B shows the changes in intensities of the light output from the center fiber 11 and monitored surrounding fiber with respect to the drawn length of the center fiber for the case in which the propagation constant βc of the center fiber 11 is approximately equal to the propagation constant βs of the surrounding fibers.

Comparing FIG. 7A with FIG. 7B, it is clear that the light injected into the center fiber 11 does not sufficiently transfer to the surrounding fibers when the difference between the propagation constant βc of the center fiber and the propagation constant βs of the surrounding fibers is large. Here, the propagation constants βc and βs depend on the refractive index distribution profiles of the center fiber 11 and the monitored surrounding fiber, respectively. However, in the case of a step-type optical fiber whose refractive indices n1 and n0 of the core and clad, respectively, are constant inside its core and clad, respectively, the propagation constants β of the step-type optical fiber can be expressed by the following equations.

$$J0(u)/u \cdot J1(u) = K0(w)/w \cdot K1(w) \qquad (3)$$

$$u^2 + w^2 = v^2 \qquad (4)$$

where $$u = Ak^2(n1)^2 - \beta^2 \qquad (5)$$

$$w = A\beta^2 - k^2 n0^2 \qquad (6)$$

$$v^2 = k^2(n1^2 - n0^2)A^2 \qquad (7)$$

Here, A represents the core diameter of the step-type optical fiber. k represents the wave number of the light wave that pass through the step-type optical fiber. Jn(x) represents the Bessel function of the first kind of n-th order. Kn(x) represents the Bessel function of the second kind of n-th order. Hence, the propagation constant β is a function that is determined by the core diameter A, the refractive indices n1 and n0 of the core and clad of the step-type fiber, respectively, the wave number k of the light that passes through the step-type fiber, and the distribution profiles of the refractive indices n1 and n0 of the step-type fiber. If the center fiber 11 and surrounding fibers are produced from the same fiber pre-form in such a manner that only the clad diameter of the center fiber differs from that of the respective surrounding fiber, the core diameter of the center fiber 11 becomes different from that of the respective surrounding fiber.

As a result, the propagation constant βs of the respective surrounding fiber becomes different from the propagation constant βc of the center fiber 11. In this case, the center fiber 11 does not transfer the injected light by a sufficient amount to the surrounding fibers. In this case, it is necessary to equalize the propagation constant βs of the respective surrounding fiber with the propagation constant βc of the center fiber. The structural parameters of the respective surrounding fiber (the core diameter As of the monitored surrounding fiber, the refractive indices n1s and n0s of the core and clad of the monitored surrounding fiber, respectively, and the distribution profiles of the refractive indices n1s and n0s of the monitored surrounding fiber) or the structural parameters of the center fiber 11 (the core diameter Ac of the center fiber 11, the refractive indices n1c and n0c of the core and clad of the center fiber 11, respectively, and the distribution profiles of the refractive indices n1s and n0s of the center fiber 11) need to be adjusted.

In addition, an optical fiber has a cutoff wavelength λc that is determined by its structural parameters. If light whose wavelength is shorter than the cutoff wavelength λc of the optical fibers is injected, the optical fiber does not always operate by single mode. For example, in using light whose wavelength is 1310 nm, it is desirable that the cutoff wavelength of the optical fiber be shorter than 1310 nm and set to, for example, 1250 nm. In designing a standard optical fiber in this case, the core diameter A and relative refractive index Δn or the like of the optical fiber are usually adjusted so that the cutoff wavelength λc of the optical fiber will become 1250 nm. In designing a multi-branching optical coupler of the present invention also, it is desirable that the center fiber 11 should have substantially the same cutoff wavelength as the surrounding fibers.

The cutoff wavelength λc of an optical fiber is a function that is determined by the refractive indices n0 and n1 of its clad and core diameter A, respectively, the distribution profiles of its refractive indices n0 and n1, respectively, and its core diameter A. For example, the cutoff wavelength λc of a step-type optical fiber can be expressed by the following equation.

$$\lambda c = 2.61356a((n1)^2 - (n0)^2)^{1/2} \qquad (8)$$

Therefore, in this case, the cutoff wavelength λcc of the center fiber can be made equal to the cutoff wavelength λcs of each of the surrounding fibers by making the core diameter Ac of the center fiber, the refractive index n1c of the core of the center fiber, and the refractive index n0c of the clad of the center fiber equal to the core diameter As of the respective surrounding fiber, the refractive index n1s of the core of the respective surrounding fiber, and the refractive index n0s of the clad of the respective surrounding fiber, respectively.

In order for the center fiber 11 and the surrounding fibers to have substantially the same propagation constant β and cutoff wavelength λc, the proportion of the core diameter of the center fiber 11 with respect to the clad diameter of the center fiber 11 is set smaller than the corresponding proportion of a standard single mode fiber, (that is, the proportion of the core diameter of the respective surrounding fiber with respect to the clad diameter of the respective surrounding fiber) at the pre-form stage of the center fiber 11. For example, suppose that eight identical fibers whose core diameters are all 9 μm have been made from a pre-form having an clad diameter of 125 μm to be used as surrounding fibers of an 8-branching optical coupler.

Additional clad can be installed around the clad of this pre-form so as to change in advance the proportion of the core diameter with respect to the incremented clad diameter. For example, when the clad diameter has reached 168 μm, a new pre-form is made. In this case, the core diameter of the new pre-form is 9 μm, which is equal to the core diameter of the respective surrounding fiber. This new pre-form is used to make the center fiber 11. In this case, the center fiber 11 has the same the core diameter A, relative refractive index Δn, and refractive index profile as the surrounding fibers. As a result, the center fiber 11 has the same propagation constant β as the surrounding fibers.

When the center fiber 11 is made using a pre-form whose relative refractive index difference Δn and refractive index distribution profile differ slightly from those of the pre-form, from which the surrounding fibers are made, the relative refractive index difference Δn and refractive index distribution profile of the center fiber 11 will differ from those of the surrounding fibers. Even in this case, the core diameter A, the mode field diameter (the diameter of a region of the fiber in which the light intensity is 1/e² of the maximum light intensity, referred to as the MFD), and the cutoff wavelength λcs of the respective single mode fiber (surrounding fiber) are adjusted so that they will approximately match the core diameter A, mode field diameter and cutoff wavelength λcc of the center fiber. In this way, the propagation constant βs (or V value) of the respective surrounding fiber can be made approximately equal to the propagation constant βc (or V value) of the center fiber 11.

Figure 8:
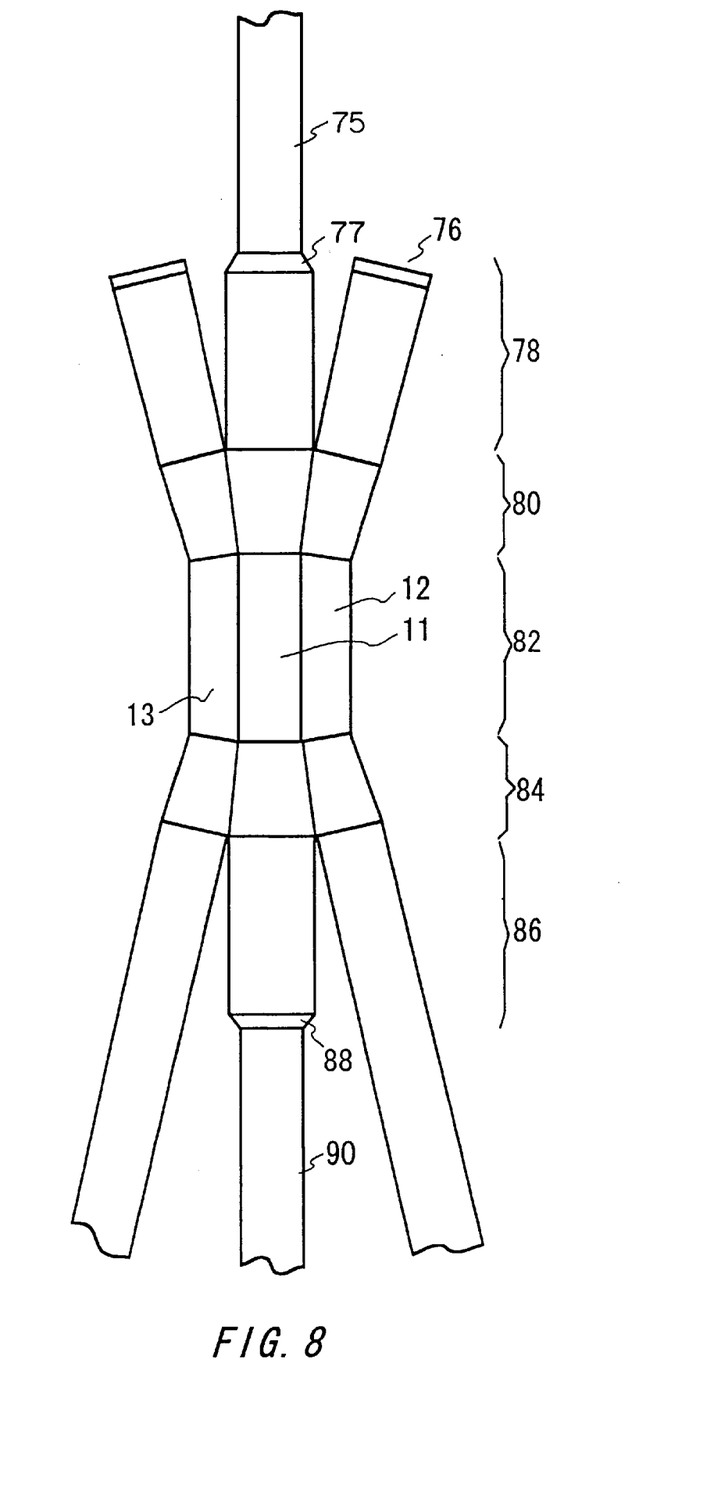
FIG. 8 shows a completed drawn multi-branching optical coupler wire.

FIG. 8 shows a drawn multi-branching optical coupler wire that has been made by heating and drawing the center fiber 11 and the surrounding fibers 12 and 13. The completed multi-branching optical coupler wire has a coupled region 82 in which the surrounding fiber 12 and 13 are fused completely with the center fiber 11. In addition, the completed optical coupler unit has extension regions 78 and 86 on the two sides, respectively, of the coupled region 82 in the axial direction.

In the extension regions 78 and 86, the surrounding fibers 12 and 13 have not been drawn. A first tapered portion 80 is formed between the coupled region 82 and the extension region 78. A second tapered portion 84 is installed between the coupled region 82 and the extension region 86. In the tapered portions 80 and 84, the center fiber 11 and surrounding fibers 12 and 13 are tapered from the extension regions 78 and 86 respectively, toward the coupled region 82. In addition, the incident light side ends 76 of the surrounding fibers 12 and 13 are made non-reflective in order to suppress the light reflection amount from the ends 76 of the surrounding fibers 12 and 13.

As is clear from FIG. 8, the center fiber 11 has an input end 77 to which light is input and an output end 88 from which the light is output. The light input to the input end 77 of the center fiber 11 is output and branches out to the output end 88 of the center fiber 11 and the surrounding fibers 12 and 13. The core of the center fiber 11 extends from the light input end 77 to the light output end 88. A clad is installed around this core. For ease of explanation, only one center fiber 11 and two surrounding fibers 12 and 13 are shown in FIG. 8. However, additional surrounding fibers may be installed evenly around the center fiber 11.

A fiber whose clad diameter is 125 μm is used for a standard optical communication. When the clad diameter of the center fiber 11 differs from that of the respective surrounding fiber, the clad diameter of the center fiber 11 or the clad diameter of the respective surrounding fiber differs from the clad diameter of the fiber used for a standard optical communication. In this case, a fiber having the standard clad diameter, 125 μm, which is used for a standard optical communication may be connected in advance or afterwards to the fiber(s) whose clad diameter differs from the clad diameter of the fiber used for a standard optical communication.

As FIG. 8 shows, when the clad diameter of the center fiber 11 is larger (for example, 168 μm) than that of the standard optical communication fiber (for example, 125 μm), standard single mode fibers 75 and 90 whose clad diameters are smaller than the clad diameter of the center fiber 11 are connected to the ends 77 and 88 of the center fiber 11. When the clad diameters of the surrounding fibers 12 and 13 are smaller than the clad diameters of the fiber used for standard optical communication, a standard single mode fiber whose clad diameter is larger than the clad diameters of the surrounding fibers 12 and 13 is connected to the light output side of each of the surrounding fibers 12 and 13. Since the core of the connected standard fiber has the same diameter as the center of surrounding fiber, the intensity loss at the connection was negligible.

When the ends of the multi-branching optical coupler are required to be tape fibers, the output side center fiber 11 is connected to a first tape fiber and the output side surrounding fibers 12 and 13 are connected to second and third tape fibers, respectively. In this way, a fiber whose clad diameter is 125 μm is connected to at least one end of the center fiber or one of the surrounding fibers. As a result, a widely applicable multi-branching optical coupler can be provided. It is preferable that the multi-branching optical coupler wire shown in FIG. 8 be covered with a rigid body such as a metal tube or the like.

1. First Example

Sixteen identical single mode fibers whose clad diameters are 125 μm were prepared. A portion of the coating on each of these fibers was removed. One of these fibers was inserted into a glass tube. The tube was attached tightly around the fiber by heating and drawing the tube. As a result, a center fiber 11 having a large clad diameter was formed. The core diameter and relative refractive index of this center fiber 11 turned out to be approximately equal to those of other single mode fibers (SMF). A large center hole 72 was formed at the centers of the masks 34a and 34b of the multi-branching optical coupler making apparatus, respectively. Fifteen surrounding holes 74 were formed around the center hole 72 of the masks 34a and 34b, respectively, separating the surrounding holes 74 from each other by an equal distance. The center fiber 11 was made to pass through the center hole 72. In addition, the above-described single mode fibers as surrounding fibers were made to pass through the surrounding holes whose interior diameters were approximately 126 μm.

One end of each of the fibers that were made to pass through the masks 34a and 34b and one end of each of the surrounding fibers was fixed with the clamp table 32a and clamp 36a. The other end of each of the fibers was held with the stress adjusting table 42b and elastic holding unit 44b. Next, the two rotation stages 30a and 30b were rotated three times in opposite directions so as to twist the bundle of fibers 31. The rotation stages 30a and 30b were fixed with a stopper to prevent the bundle of fibers from being untwisted.

The fibers 31 were drawn heating with the burner 22 of oxyhydrogen flame the centers of the twisted portions of the fibers 31, respectively. A light was injected to the input end 68 of the center fiber 11. The light output from the output end 70 of the center fiber 11 and the output from one of the fifteen surrounding fibers were monitored. The heating and drawing process was stopped when the amount of light output from the output end 70 of the center fiber became equal to the amount of light output from the monitored surrounding fiber. In this way, a multi-branching optical coupler wire was made. This multi-branching optical coupler wire was fixed with resin on a quartz glass substrate. After this, the multi-branching optical coupler wire was stored in a cylindrical metal case. As a result, a 16-branching optical coupler was made. The size of this coupler case turned out to be 3.5 mm (diameter)×65 mm (length), which is significantly smaller than a conventional multi-step connected coupler case.

Figure 9:
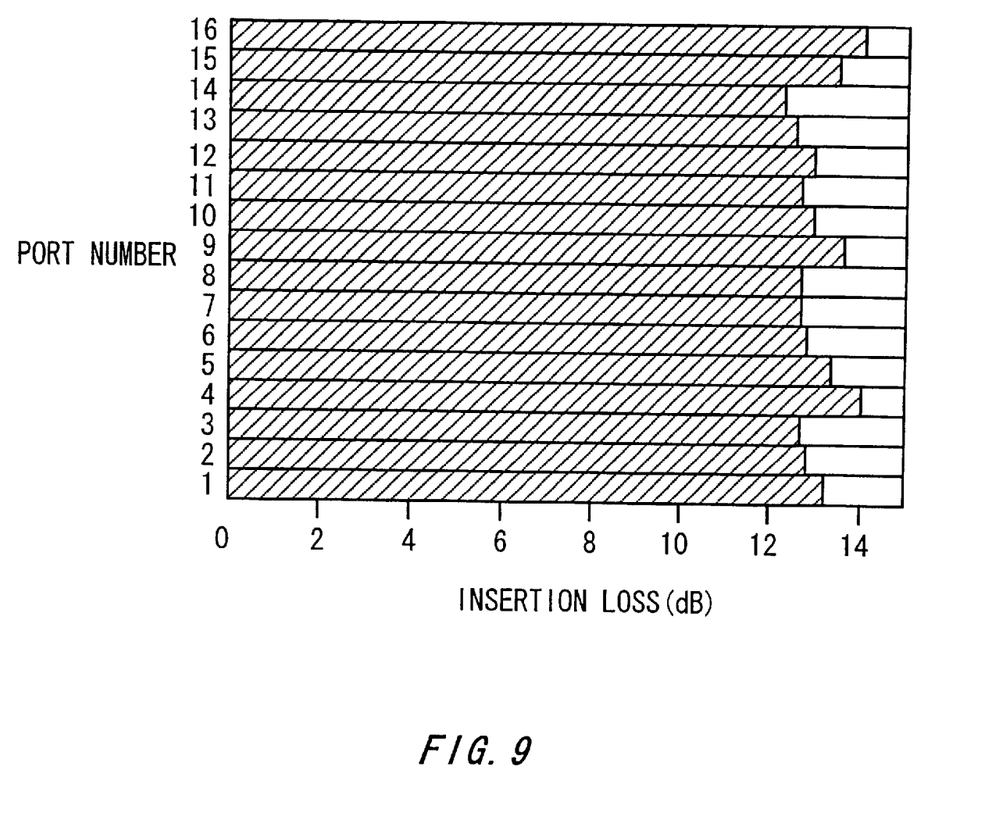
FIG. 9 shows the relation between the insertion loss and output from each output port of the multi-branching optical coupler according to the present invention.

FIG. 9 shows the relation between the insertion loss and output from each output port of the 16-branching optical coupler according to the first embodiment. The average of the insertion losses of the sixteen output ports of this 16-branching optical coupler turned out to be 13.14 dB. The standard deviation of the insertion losses of the sixteen output ports of this 16-branching optical coupler turned out to be 0.53 dB. This confirms that the output balance of the resultant multi-branching optical coupler is satisfactory.

2. Second Example

An example of making method of a 1 input×8 outputs branching optical coupler is described here. A fiber having a diameter 168 μm and approximately the same core diameter and relative refractive index as a single mode fiber (SMF) was made to pass through a center hole 72 of the masks 34a and 34b. Standard single mode fibers having diameters 125 μm were made to pass through the surrounding holes 74. One end of each of these fibers was fixed with the clamp table 32a and clamp 36a. The other end of each of these fibers was held with the stress adjusting table 42b and elastic holding unit 44b. Next, the two rotation stages 30a and 30b were rotated three times in opposite directions so as to twist the bundle of fibers 31. The tension applied to each of the fibers 31 was adjusted with the stress adjusting unit 40b. As a result, the fibers 31 were prevented from being disconnected.

In addition, the fibers were drawn at the rate of 120 μm/sec. shaking the burner 22 of propane/oxygen flame with amplitude 5 mm in the axial direction of the fibers while the centers of the fibers 31 were heated. The heating-drawing process was stopped when the amount of light output from the center fiber 11 became approximately equal to the amount of light output from arbitrary one of the surrounding fibers. After this, the stress generated by the stress-adjusting unit 40b was temporarily released. The fibers 31 were then held again. After this, the clamp 36b was removed. The shifting stage 35b was then shifted again so as to apply a tension to the fibers 31. Both ends of the fused portion of the fiber bundle were fixed with glue to a quartz glass plate while keeping the tension applied to the fibers 31. In this way, 1 input×8 outputs branching optical coupler was completed.

3. Third Example

A method for making a coupler which equally branches a light of wavelength 1.31 μm will be described here. First, two identical fibers having a clad diameter 125 μm were prepared. A portion of the coating on each of these fibers was removed. The clad of these fibers were brought into contact with each other. These fibers were then drawn heating them with oxyhydrogen flame. The intensities of the lights output from these fibers were monitored with the light receiving units 64 and 66, respectively while the fibers were being heated and drawn. The heating and drawing process was stopped when a desired branching ratio was achieved. As a result, 2-branching optical coupler wire was made. The branching proportion and excess loss of this 2-branching optical coupler wire was 50.2% and 0.04 dB, respectively.

When the temperature of the fibers 31 decreased to a sufficient level, the drawing stage 35b was shifted outward by 0.02 mm at the rate of approximately 100 μm/sec. In this way, the 2-branching optical coupler wire was pulled. Both ends of the fused portion of the 2-branching optical coupler wire were fixed on a quartz glass substrate with resin while keeping a tension applied to the 2-branching optical coupler wire. The resultant 2-branching optical coupler wire was then stored in a metal case. A heat cycle test of range between −40° C. and 85° C. was conducted on the resultant 2-branching optical coupler wire.

The resultant 2-branching optical coupler does not pass the test if the amount of change in the insertion loss during the test is more than a prescribed value. The resultant 2-branching optical coupler passes the test if the amount of change was below the prescribed value. After the heating process was completed, a multi-branching optical coupler which was made by fixing it on a quartz glass substrate applying a tension to the 2-branching optical coupler wire and a multi-branching optical coupler which was made by fixing it on a quartz glass substrate without applying a tension to the 2-branching optical coupler wire were tested. The test result is shown in the following table 1.

TABLE 1

| Unheated drawing | Number of samples | Heat cycle test passing rate |
|---|---|---|
| Done | 25 | 98% |
| Not done | 25 | 65% |

As the test result shows, by fixing the multi-branching optical coupler on a glass substrate applying a tension to the multi-branching optical coupler wire after the heating process was completed, the heat cycle test passing rate was significantly increased.

Although the present invention has been described using its embodiments, the scope of the present invention is not limited to these embodiments. Those skilled in the art can add various modifications and improvements to the embodiments of the present invention. It is clear from the claims that such modified or improved embodiments can be also covered by the scope of the present invention. In particular, the total number of branching fibers suffices to be greater than or equal to two, and is not limited to eight or sixteen as described in the embodiments of the present invention. This patent application claims priority based on four Japanese patent applications No. 9-171755 filed on Jun. 27, 1997, No. 9-276905 filed on Oct. 9, 1997, No. 9-173371 filed on Jun. 30, 1997 and No. 9-266244 filed on Sep. 30, 1997. The contents of these four Japanese patent applications are incorporated herein by reference.

As is clear from the above explanation, according to the multi-branching optical coupler making apparatus and multi-branching optical coupler making method of the present invention, a multi-branching optical coupler, which is capable of branching the injected light to the center fiber and surrounding fibers with any desired branching proportion, can be easily made.

What is claimed is:

1. An apparatus for making a multi-branching optical coupler, which branches light injected to one fiber to a plurality of fibers, comprising:

a mask having a center hole configured to pass through a center fiber selected from said plurality of fibers, and a plurality of surrounding holes configured to pass through surrounding fibers that are remainder of said plurality of fibers, such that said surrounding holes are arranged around said center hole and are separated from each other by an equal distance;

a rotation stage configured to rotate said mask so as to twist said surrounding fibers about said center fiber;

a stress adjusting unit that is configured to compensate for the difference among each of stresses, which are generated in said center fiber and each of said surrounding fibers by twisting of said center fiber and surrounding fibers with said rotation stage respectively;

a heating apparatus configured to heat said center fiber and said surrounding fibers that have been twisted by said rotation stage about said center fiber; and a drawing stage configured to draw said center fiber and surrounding fiber that have been heated with said heating apparatus.

2. An apparatus for making a multi-branching optical coupler as claimed in claim 1, wherein said stress adjusting unit is installed on said rotation stage so that said stress adjusting unit rotates together with said rotation stage.

3. An apparatus for making a multi-branching optical coupler as claimed in claim 2, further comprising a clamp installed between said stress adjusting unit and said heating apparatus, said clamp being configured to fix said center fiber and surrounding fibers, and a sliding holding unit which holds said plurality of fibers so that said plurality of fibers slide freely; wherein said clamp and said sliding holding unit are installed on said rotation stage so that said clamp and said sliding holding unit rotate together with said rotation stage.

4. An apparatus for making a multi-branching optical coupler as claimed in claim 1, wherein said mask has seven or more surrounding holes and the diameter of said center hole is larger than the diameters of said surrounding holes.

5. An apparatus for making a multi-branching optical coupler as claimed in claim 4, wherein the diameter of said center fiber CLDc, the diameter of said surrounding holes CLDs, and a total number n of said center hole and surrounding holes satisfy an equation, $$0 \leq CLDc - (CLDs/\sin(\pi/(n-1))) + CLDs \leq 100 \ \mu m.$$

6. An apparatus for making a multi-branching optical coupler, which branches light injected to one fiber into a plurality of fibers, comprising:
   a rotation stage configured to twist said plurality of fibers;
   a stress adjusting unit configured to compensate for a difference among each of stresses that are generated in said fibers by twisting of said fibers with said rotation stage, respectively;
   a heating apparatus for heating said plurality of fibers that have been twisted with said rotation stage; and
   a drawing stage that shifts said fibers that have been heated with said heating apparatus.

7. An apparatus for making a multi-branching optical coupler as claimed in claim 6, further comprising a clamp installed between said stress adjusting unit and said heating apparatus that is configured to fix said fibers, and a sliding holding unit which holds said fibers so that said fibers slide freely;
   wherein, said clamp and said sliding holding unit are installed on said rotation stage so that said clamp and said sliding holding unit rotate together with said rotation stage.

8. An apparatus for making a multi-branching optical coupler as claimed in claim 6, wherein said stress adjusting unit includes elastic holding units that elastically are configured to hold said plurality of fibers independently from each other.

9. An apparatus for making a multi-branching optical coupler as claimed in claim 5, further comprising:
   a mask having a center hole that is configured to pass through a center fiber selected from said plurality of fibers, and a plurality of surrounding holes that are configured to pass through surrounding fibers that are a remainder of said plurality of fibers, such that said surrounding holes are arranged around said center hole and are separated from each other by an equal distance;
   wherein said stress adjusting unit holds said center fiber that has passed through said center hole and said surrounding fibers that have passed through said surrounding holes.

10. An apparatus for making a multi-branching optical coupler as claimed in claim 9, further comprising:
    a monitor light outputting apparatus that is configured to inject a monitor light to a light input end of said center fiber; and
    a light receiving apparatus that is configured to monitor a light output from an output end of said center fiber and another light output from one of said surrounding fibers.

11. An apparatus for making a multi-branching optical coupler as claimed in claim 10, further comprising:
    a stopping means configured to stop the shift of said drawing stage when the intensity of the light output from said output end of said center fiber becomes substantially equal to the intensity of said another light output from said one of said surrounding fibers.

12. An apparatus for making a multi-branching optical coupler as claimed in claim 9, wherein said mask has seven or more surrounding holes and a diameter of said center hole is larger than diameters of said surrounding holes.

13. A method for making a multi-branching optical coupler, which branches injected light to a plurality of fiber, the method comprising:
    preparing one center fiber having an input end to which said light is injected and an output end from which one of the branched light is output;
    arranging surrounding fibers on the exterior circumference of said center fiber separating said surrounding fibers from each other by substantially an equal distance;
    heating with a heating apparatus said center fiber and surrounding fibers that have been arranged; and
    drawing said center fiber and surrounding fibers, which have been heated, in an axial direction of said center fiber so as to form a fused portion where each of said surrounding fibers is fused to said center fiber,
    wherein arranging the surrounding fibers includes:
        preparing a mask having a center hole and surrounding holes formed around said center hole, spacing said surrounding holes from each other by substantially an equal distance;
        passing said center fiber through said center hole;
        passing said surrounding fibers through said surrounding holes;
        twisting said surrounding fibers about said center fiber by rotating said mask; and
        compensating for differences among each of stresses generated in said center and said surrounding fibers, respectively, by holding said center fiber and surrounding fibers passed through said mask, independently of each other with elastic holding units.

14. A method for making a multi-branching optical coupler as claimed in claim 13, wherein arranging the surrounding fibers includes fixing said center fiber and surrounding fibers, after the surrounding fibers have been twisted about the center fiber, using a clamp installed between said elastic holding unit and said heating apparatus and a sliding holding unit, which holds said center fiber and surrounding fibers so that said center fiber and surrounding fibers slide freely.

15. A method for making a multi-branching optical coupler as claimed in claim 13 further comprising:
    inputting a monitor light to an input end of said center fiber;
    monitoring outputs from an output end of said center fiber and one of said surrounding fibers; and
    terminating heating and drawing said center fiber and surrounding fibers, when the intensity of the light output from said output end of said center fiber becomes substantially equal to the intensity of said light output from said one of said surrounding fibers.

16. A method for making a multi-branching optical coupler as claimed in claim 15 further comprising:
    releasing said elastic holding units once to release said center fiber and surrounding fibers from said elastic holding units and re-initiating holding of said center fiber and surrounding fibers again by said elastic holding units;
    releasing said clamp to release said center fiber and surrounding fibers from said clamp; and
    applying a tension to said fused portion of the center fiber and surrounding fibers after said terminating heating and drawing said center fiber and surrounding fibers.

17. A method for making a multi-branching optical coupler as claimed in claim 16, wherein said applying a tension to said fused portion includes shifting a drawing stage, which shifts at least one end of said center fiber and one end of said surrounding fibers, by a prescribed distance.

18. A method for making a multi-branching optical coupler as claimed in claim 16, further comprising fixing both ends of said fused portion, to which tension has been applied, to a rigid member.

19. A method for making a multi-branching optical coupler as claimed in claim 13, further comprising connecting a fiber having a clad diameter that is smaller than said clad diameter of said center fiber to said input end of said center fiber and connecting another fiber having a clad diameter that is smaller than said clad diameter of said center fiber to said output end of said center fiber.

20. A method for making a multi-branching optical coupler as claimed in claim 13, further comprising applying a non-reflection process to the ends of said surrounding fibers that are close to said input end of said center fiber.

* * * * *